United States Patent [19]

Dorner

[11] Patent Number: 4,487,309
[45] Date of Patent: Dec. 11, 1984

[54] CONVEYOR SYSTEM
[75] Inventor: Wolfgang C. Dorner, Oconomowoc, Wis.
[73] Assignee: Dorner Mfg. Corp., Hartland, Wis.
[21] Appl. No.: 337,590
[22] Filed: Jan. 7, 1982
[51] Int. Cl.³ ............................................. B65G 37/00
[52] U.S. Cl. .................................. 198/491; 198/633
[58] Field of Search ................ 198/345, 491, 492, 633

[56] References Cited
U.S. PATENT DOCUMENTS

| | | | |
|---|---|---|---|
| 1,632,204 | 6/1927 | Threefoot et al. | 198/491 |
| 2,498,989 | 2/1950 | Erland et al. | 198/633 |
| 3,092,237 | 6/1963 | Miller | 198/345 |
| 3,811,548 | 5/1974 | Neff | 198/345 |

Primary Examiner—Joseph E. Valenza
Assistant Examiner—Jonathan D. Holmes
Attorney, Agent, or Firm—Andrus, Sceales, Starke & Sawall

[57] ABSTRACT

A conveying system including a pair of endless belt conveyors that are in vertically spaced relation. A series of work stations are located along the length of the conveyors and a plurality of small pallets which contain workpieces or component parts are conveyed on the upper conveyor and are individually pushed from the upper conveyor onto an inclined lateral conveyor where they are delivered to a work station. After a working operation has been performed on the workpiece, the pallets are conveyed to the lower conveyor. A plurality of finger stop assemblies are located in the conveyor system and are arranged to stop and accumulate a series of pallets. On signal, the finger stop assemblies are retracted to permit movement of the pallets on the conveyor. A pivotable conveyor section is incorporated in the system and can, when pivoted, transfer pallets from the lower conveyor to the upper conveyor. The conveyor system also includes a rotary transfer mechanism for transferring pallets from a location along the length of one conveyor to a second parallel conveyor at the same level.

7 Claims, 14 Drawing Figures

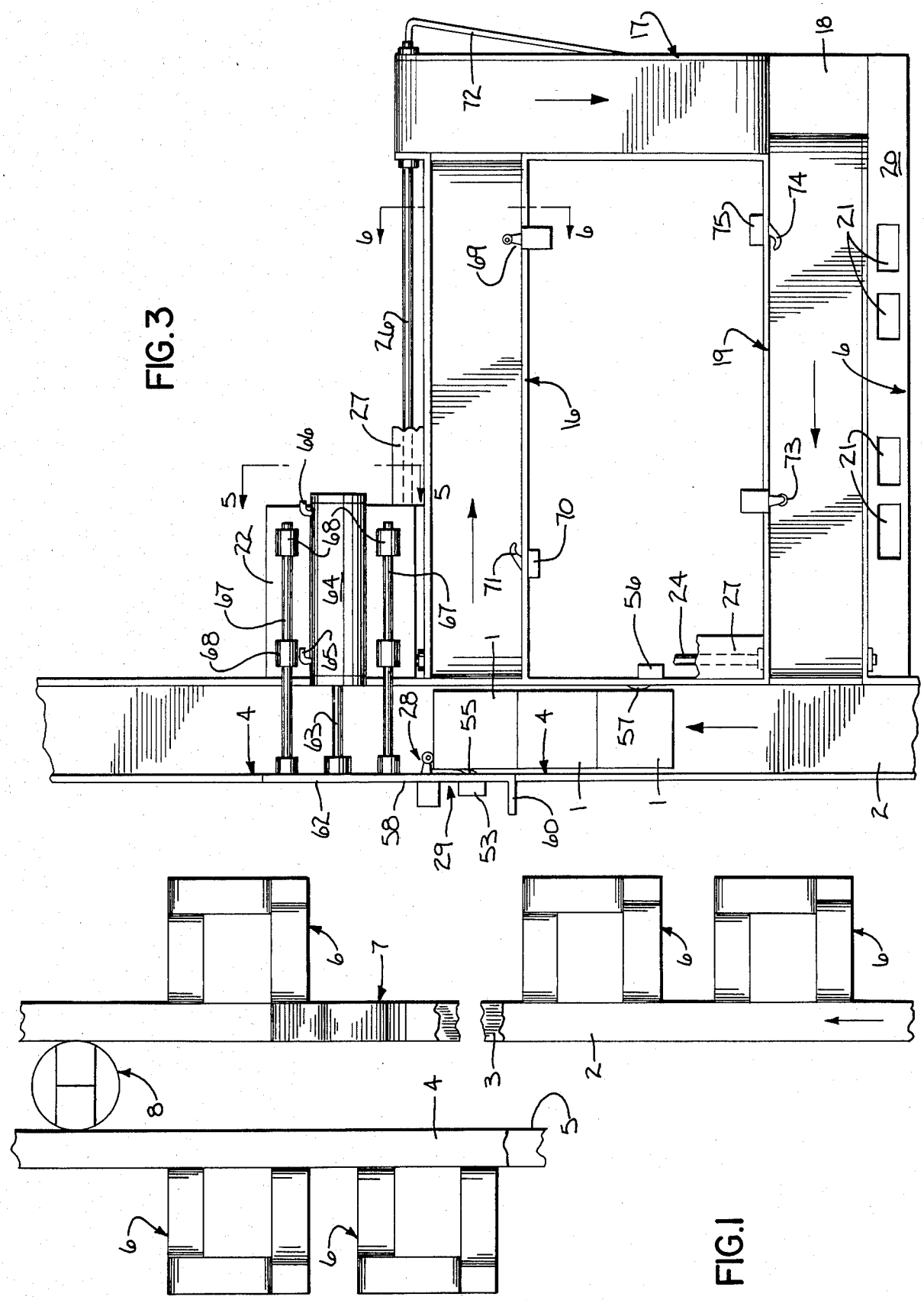

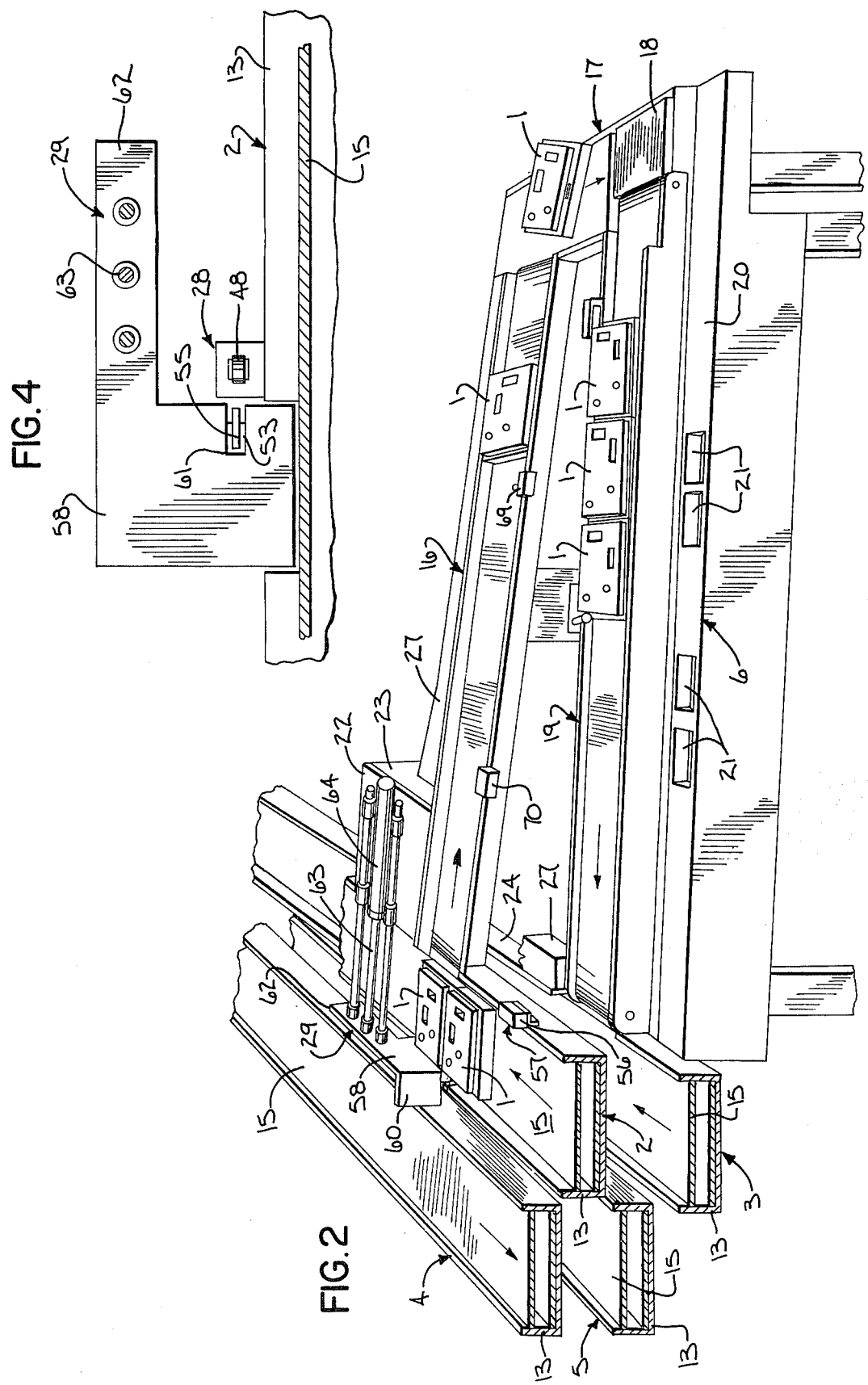

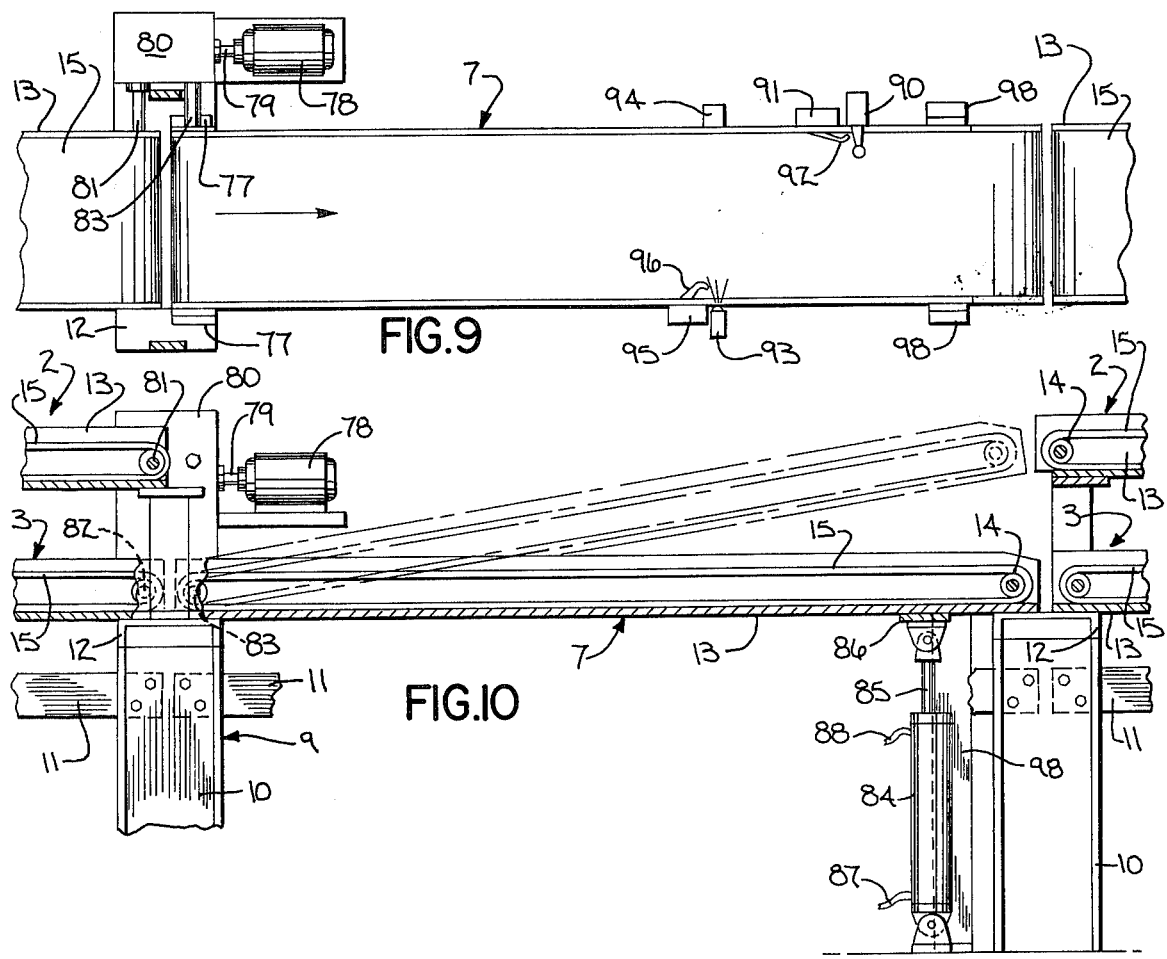
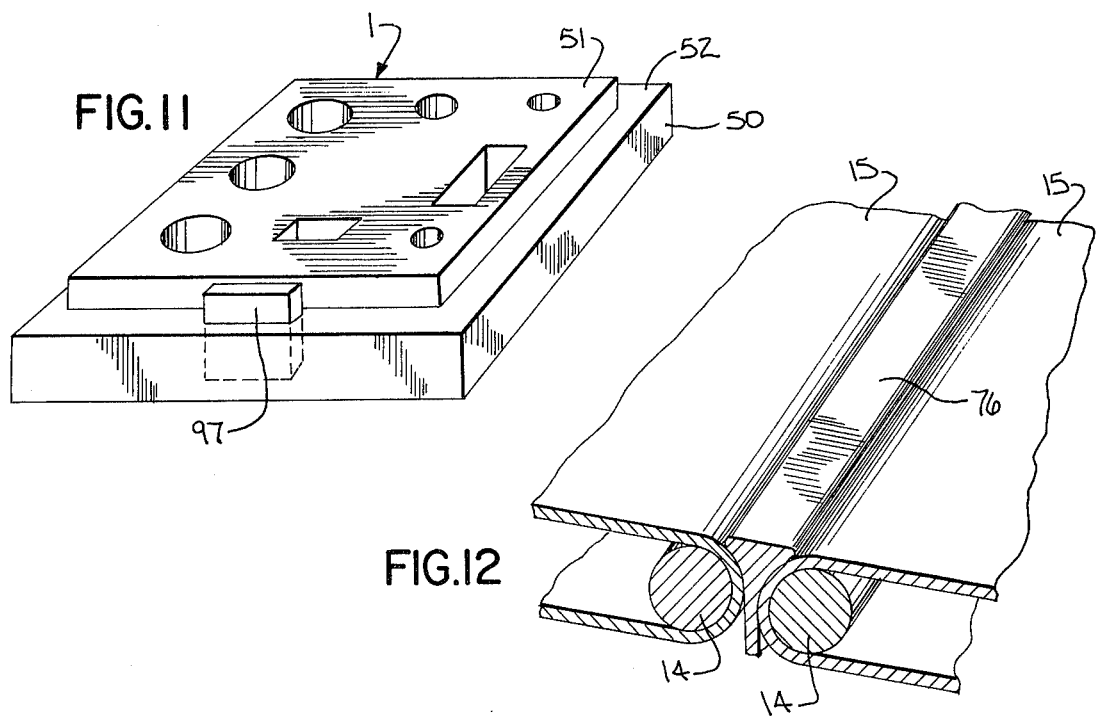

CONVEYOR SYSTEM

BACKGROUND OF THE INVENTION

Automatic conveyor systems have been used to route articles between a series of work stations where various working operations can be performed on the articles.

In the assembly of smaller articles, which include a number of small component parts, the workpiece can be held in a small pallet, and the pallets are moved on the conveyor system to deliver the pallet to various work stations where component parts can be assembled with the work piece or where the workpiece can be inspected or tested.

SUMMARY OF THE INVENTION

The invention is directed to an improved conveying system for conveying small pallets that contain a workpiece or component parts. In accordance with the invention, the conveying system includes an upper endless belt conveyor and a lower endless belt conveyor that is located beneath the upper conveyor and travels in the same direction as the upper conveyor.

A series of work stations are located along the length of the conveyors and the small pallets are individually moved from the upper conveyor to the individual work stations and then are conveyed onto the lower conveyor. At each work station, an inclined endless belt conveyor extends laterally downward from the upper conveyor and the pallets are individually delivered onto the inclined conveyor and then moved to the work station.

After the working operation has been completed, the pallet is moved on a return conveyor to the lower conveyor in the main conveying system.

The mechanism that enables each pallet to be moved from the upper conveyor onto the inclined conveyor at the work station includes a finger stop assembly which is associated with the upper conveyor. The stop assembly includes a finger or plunger that is movable between an obstructing position, located above the upper conveyor belt, to a retracted or non-obstructing position. With the finger in the obstructing position, the pallets moving along the upper conveyor will engage the finger and a group of pallets will be stopped in the form of a train. When it is desired to move a pallet to the work station, a pusher assembly is operated to push the leading pallet in the train laterally from the upper conveyor onto the inclined conveyor for delivery to the working area.

Similar finger stop assemblies are located at various positions throughout the conveyor system and act to stop and accumulate pallets in accordance with demand. When there is no demand for pallets at the work stations, the fingers stop assemblies will individually release the pallets for movement along the conveyor. To release a pallet, the finger or plunger of the stop assembly is momentarily moved to the retracted position by a fluid cylinder to permit the leading pallet in the train to pass the stop, and on release of the fluid pressure, the finger will be biased toward the extended position by a spring and will then ride against the side surface of the leading pallet, as the pallet moves forwardly on the conveyor. When the pallet moves past the finger, the biasing force will cause the finger to drop behind the pallet in the obstructing position to stop movement of the next succeeding pallet in the train.

The conveyor system of the invention also includes a pivotable conveyor section which can be utilized to either transfer pallets directly along one of the main conveyors, or alternately, to transfer pallets from the lower conveyor to the upper conveyor.

As a further feature of the invention, one or more rotary transfer units can be incorporated in the conveyor system to move pallets from one conveyor to a second parallel conveyor at the same level. In transferring the pallets, the pallets are rotated through 180° so that the same side of the pallet is leading in travel on both conveyors.

Other objects and advantages will appear in the course of the following description.

DESCRIPTION OF THE DRAWINGS

The drawings illustrate the best mode presently contemplated of carrying out the invention.

In the drawings:

FIG. 1 is a schematic plan view of the conveyor system of the invention;

FIG. 2 is a perspective view of a work station;

FIG. 3 is a plan view of a work station;

FIG. 4 is a section taken along line 4—4 of FIG. 3;

FIG. 9 is a plan view of a pivotable conveyor section;

FIG. 10 is a vertical section of the conveyor section shown in FIG. 9;

FIG. 11 is a perspective view of a pallet;

FIG. 12 is an enlarged fragmentary perspective view showing the spacer between conveyor sections;

DESCRIPTION OF THE ILLUSTRATED EMBODIMENT

Figure 5:
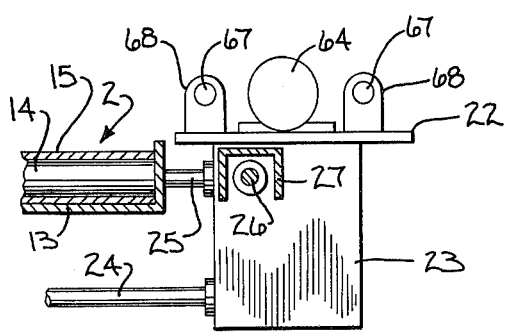
FIG. 5 is a section taken along line 5—5 of FIG. 3.

FIG. 1 is a schematic representation of a conveyor system constructed in accordance with the invention. In use of the conveyor system, a plurality of pallets 1, which are shaped to hold a workpiece, are conveyed through a series of work stations where various assembly, inspection or testing operations are performed on the workpiece, either automatically or manually. The conveyor system, in general, comprises an upper conveyor 2 and a lower conveyor 3 which is spaced beneath the upper conveyor 2. In addition, the conveyor system can include a second upper conveyor 4 and lower conveyor 5 which are parallel to the conveyors 2 and 3.

The pallets 1 containing the workpieces are automatically routed to a series of stations, indicated generally by 6, where the various operations are performed on the workpiece. In addition, the conveyor system can include a pivotable section 7, which serves to convey the pallets 1 upwardly from the lower conveyor 3 to the upper conveyor 2, and can include one or more rotary transfer units 8 that function to transfer pallets from the conveyor 2 to the conveyor 4 while rotating the pallets 180° to maintain their proper orientation in the conveyor line.

As best shown in FIG. 10, the various conveyors are supported on a frame or supporting structure 9 which is composed of a series of vertical channels 10 and longitudinal channels 11 which are secured to the vertical channels. In addition, a plurality of horizontal cross channels 12 are secured to the upper ends of corresponding pairs of vertical channels 10 and extend transversely across the conveyor. The conveyors 2-5 are mounted on the cross channels 12.

Each of the conveyors 2-5 can be constructed in the manner set forth in U.S. Pat. No. 3,923,148. In general, each conveyor is composed of a channelshaped frame 13 and rollers 14 are journalled within the side walls of the frame and an endless conveyor belt 15, formed of polyurethane, or the like is trained over the rollers 14.

As best shown in FIG. 2, the side walls of the frame 13 project slightly above the level of the upper run of the belt 15. The pallets 1 are square in shape and the sides of the pallet are slightly smaller than the width of the belt, so that the pallets will be guided in movement on the conveyors by the projecting side walls of the frame 13.

The conveyors are driven in a conventional manner by electric motors which act through gear boxes and are connected to one of the rollers 14 of the conveyor. In some instances a gear box may drive a number of conveyors, while in other instances a single gear box will be employed to drive a single conveyor.

FIG. 2 is a perspective view showing a typical station 6 at which a working operation is performed on the workpieces or articles that are mounted in the pallets 1. Each station 6 includes an inclined conveyor 16 which extends downwardly and laterally from the upper conveyor 2. The lower end of the conveyor 16 communicates with a cross conveyor 17 which is inclined laterally and conforms to the angle of inclination of conveyor 16. Located at the downstream end of the conveyor 17 is a fixed dead plate 18 and a horizontal return conveyor 19 connects the downstream end of conveyor 17 to the lower conveyor 3.

As shown in FIG. 2, a work table 20 can be mounted alongside the conveyor 19 and may include wells 21 that contain parts or components to be added to the workpiece or article carried by the pallets 1.

To drive the conveyors associated with each work station 6, a platform 22 is mounted on the frame 9 and extends laterally from the conveyor 2. A gear box 23 is mounted on the underside of the platform, as shown in FIG. 5. The drive shaft of a motor, not shown, is connected to the input of the gear box and the gear box 23 includes three output shafts 24, 25 and 26. The lower shaft 24 extends parallel to the conveyor 2 and is connected to the drive roller 14 of conveyor 19, while the upper shaft 25 is connected to the drive roller of the inclined conveyor 16. The third output shaft 26, which is connected through a universal joint to the gearing in the gear box, extends diagonally downward and is connected to the drive roller 14 of the cross conveyor 17. In practice, shields, such as 27, can be positioned over the shafts 24-26 to protect the workers.

The movement of the pallets 1 along the upper conveyor 2 is controlled at each work station 6 by a finger stop assembly 28. When the finger stop assembly 28 is in its obstructing position, the pallets 1 moving along the conveyor 2 will engage the stop assembly to stop the line of pallets, as shown in FIG. 3. A pusher unit 29 can then be actuated to push the pallet 1, which is engaged with the finger stop assembly 28, laterally onto the inclined conveyor 16 so that the pallet will move down conveyor 16, across conveyor 17 to the work area on the conveyor 19.

Figure 8:
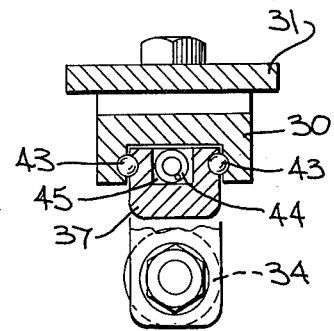
FIG. 8 is a section taken along line 8—8 of FIG. 6.
Figure 6:
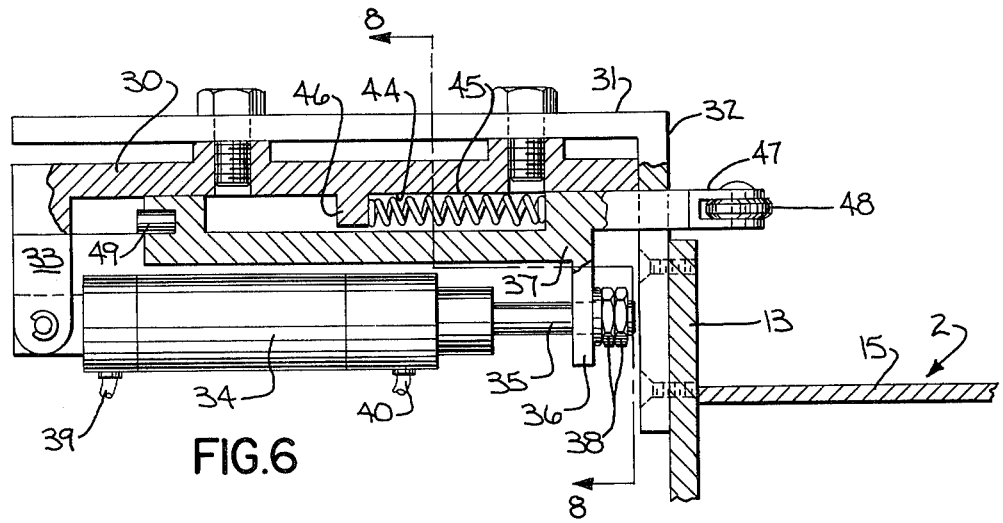
FIG. 6 is a vertical section of a finger stop assembly.
Figure 7:
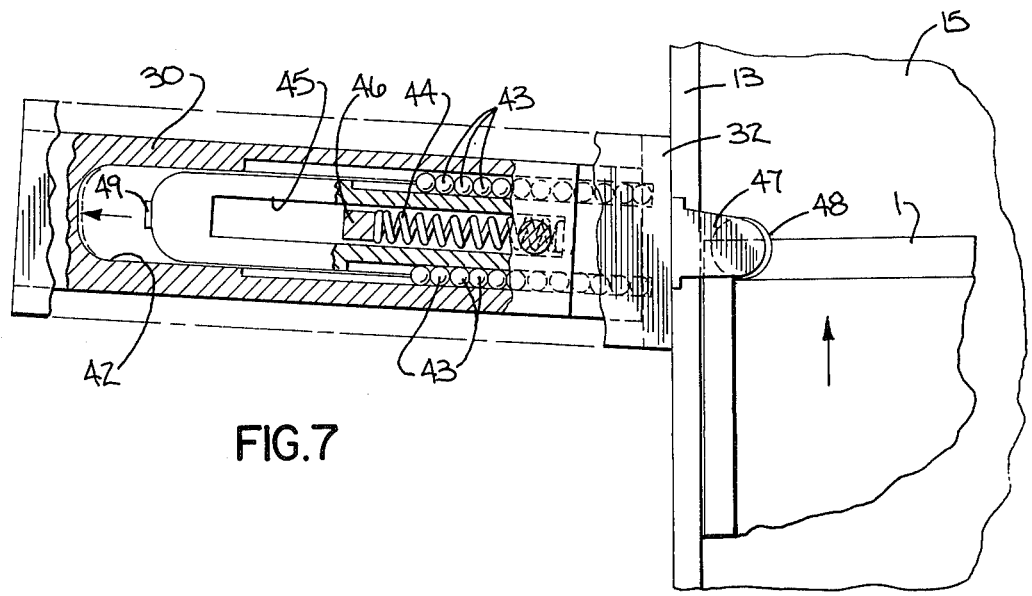
FIG. 7 is an enlarged plan view with parts broken away in section of the finger stop assembly; of FIG. 6.

As will be hereinafter described, there are a number of finger stop assemblies 28 that are located at various positions in the conveyor system. The construction of the finger stop assemblies is shown in FIGS. 6-8. Each assembly 28 includes a housing 30 which is mounted on the horizontal flange 31 of the angle bracket 32 connected to the side wall of the conveyor frame 13. A pair of lugs 33 extend downwardly from the outer end of the housing 30 and the end of a pneumatic cylinder 34 is pivotally connected to the lugs 33. A piston rod 35 of the cylinder 34 extends freely through an opening in a bracket 36 which extends downwardly from a slide 37 and nuts 38 are threaded on the outer end of the piston rod 35. The cylinder 34 is double acting type and air is supplied to the opposite ends of the cylinder through lines 39 and 40 respectively.

The slide 37 is adapted to slide within a recess or guideway 42 formed in the lower surface of the housing 30. To provide smooth sliding movement for the slide 37 within the guideway 42, the sides of both the housing 30 and the slide 37 are formed with mating grooves which receive a plurality of ball bearings 43.

The slide 37 is biased outwardly with respect to the housing 30 by a spring 44 which is mounted within a groove 45 in the slide 37. The outer end of the spring bears against a stop 46 formed in the guideway 42 of the housing. With this construction the force of the spring will urge the slide 37 outwardly of the housing 30 in a direction toward the conveyor 2.

The slide 37 is provided with an outer tapered clevis 47 and a roller 48 is mounted for rotation on the clevis 47. The axis of the roller 48 is vertical and the roller is adapted to ride along the side of the pallets 1 in a manner to be more fully described.

To cushion the return or inward movement of the slide 37, a resilient bumper 49 is mounted within a recess in the inner end of the slide and is adapted to engage the end of the guideway 42 as the slide 37 is moved inwardly of the housing 30.

The configuration of the pallet is best illustrated in FIG. 11. Each pallet is formed with a base section 50 and an upper section 51 of smaller dimension, which is joined to the base by a step or shoulder 52. The upper surface of the base 50 may contain one or a series of recesses to receive the workpiece or article on which the work operation is to be performed.

The slide 37 is normally in an extended position to form an obstruction to the movement of the pallets 1 on the conveyor 2. Thus, the upper section 51 of the pallet 1 will engage the roller 48 to prevent movement of the pallet on the moving conveyor belt, as illustrated in FIG. 7. When it is desired to route the pallet 1 straight through on the conveyor 2, the slide 37 is retracted by operation of the cylinder 34, thereby moving the roller 48 laterally of the conveyor to a non-obstructing position. The retraction of the cylinder 34 is maintained for a period of time sufficient to permit a portion of the length of the pallet to pass the roller 48 and the piston rod 35 is then extended, bringing the roller 48 into contact with the upper section 51 of the moving pallet. Engagement of the roller 48 with upper section 51 the pallet will prevent the slide 37 from moving to fully extended position. However, as the piston rod 35 is freely mounted within the bracket 36, the piston rod can move to its fully extended position, even though the slide 37 is restrained at this time.

When the pallet is moved downstream to a position where it passes the roller 48 of the finger stop, the slide 37 will then be urged to its fully extended position by the spring 44 so that the finger stop will then provide an obstruction which will prevent the next succeeding pallet from moving downstream on the conveyor 2. The frictional resistance of the roller 48 against the pallet is less than the frictional resistance of the pallet on the conveyor belt, so that the pressure of the roller 48 against the side of the pallet will not prevent the pallet from moving along the conveyor.

As best illustrated in FIG. 7, the axis of the slide 37 is disposed at an angle of about 5° with respect to a line extending laterally or transverse of the conveyor. Thus, the front edge of the pallet will engage the side of the tapered end 47 flatwise. With this manner of engagement, the initial withdrawal or retraction of the slide 37 will tend to move the tapered end 47 out of engagement with the pallet to decrease the frictional resistance and enable the slide to be retracted more readily.

To control the movement of the pallets 1 on the conveyor system, a series of limit switches are utilized. As shown in FIG. 3, a limit switch 53 is mounted above the conveyor 2, immediately upstream of the finger stop assembly 28. The limit switch 53 is mounted on a bracket attached to the side wall of the conveyor frame 13, and an arm 55 is pivotally connected to the limit switch and projects outwardly into the path of the pallets moving on the conveyor 2. When a pallet is engaged with the finger stop assembly 28, the side of the pallet will engage arm 55 to actuate the limit switch 53 and indicate that a pallet is in the stopped position.

A second limit switch 56 is mounted in a similar manner on the opposite side wall of the conveyor frame 13 and has a pivoted arm 57 which projects into the path of the pallets moving on the conveyor 2. The limit switch 56 is positioned a multiple of pallet lengths behind the finger stop assembly 28, as for example, it may be position 2½ pallet lengths behind the stop. Thus, when three pallets are stacked behind the finger stop assembly 28, the limit switch arm 57 will be tripped and this will send a signal to a finger stop assembly upstream on conveyor 2 to prevent further pallets from being sent downstream along the conveyor.

The pusher unit 29 which operates to push a single pallet from the conveyor 2 onto the inclined conveyor 16, includes a generally vertical pusher plate 58, best illustrated in FIG. 4, and the upstream end of the plate 58 is provided with a laterally extending flange 60. As the pusher plate is moved laterally across the conveyor 2, the flange 60 will ride against the next upstream pallet to prevent the pallet from moving downstream on the conveyor until the pusher plate has returned to its original retracted position. As shown in FIG. 4, the pusher plate is provided with a notch 61 and the arm 55 of limit switch 53 projects through the notch.

To move the pusher plate in reciprocating movement, an extension 62 extends downstream from the upper edge of the pusher plate and a piston rod 63, which is slidable within cylinder 64, is connected to the extension. Cylinder 64 is mounted on platform 22. To actuate the piston rod, air or other fluid is introduced into the opposite ends of the cylinder through lines 65 and 66, respectively. Guide rods 67 are also connected to the extension 62, on opposite sides of the piston rod 63, and during extension and retraction of the piston rod 63, the guide rods 67 slide within bushings 68 mounted on platform 22.

As the pusher plate 58 moves laterally across the conveyor 2, the pallet 1, which is engaged with the finger stop assembly 28, will be moved onto the inclined conveyor 16 and movement of the conveyor belt will move the pallet laterally toward the cross conveyor 17.

A second finger stop assembly 69, identical in construction to finger stop assembly 28, is mounted adjacent the downstream end of the conveyor 16, and when in the extended position, will stop the movement of the pallet 1 moving downwardly along the inclined conveyor 16.

A limit switch 70, similar to limit switch 56, is mounted on the side wall of the frame 13 of conveyor 16 and is provided with a pivot arm 71 which projects over the conveyor. When the limit switch 70 has been actuated by a series of pallets stacked against the finger stop assembly 69, a signal is sent to the pusher unit 29 to prevent additional pallets from being pushed laterally onto the inclined conveyor 16.

If switch 70 is satisfied, meaning that the switch is actuated by a train of pallets held by finger stop assembly 69, and if a pallet is engaged with finger stop 28 on conveyor 2, then a station downstream can call for a pallet and stop 28 will retract to permit pallets to move along conveyor 2 to the downstream station until switch 70 calls for a pallet. With this system, the upstream work stations 6 are satisfied first, and when they are satisfied, pallets can then move to downstream work stations. However, any desired system of pallet routing can be utilized.

To facilitate the transfer of the pallets from the inclined conveyor to the cross conveyor 17, a guide rail 72 can be mounted along the side of the cross conveyor 17. The guide rail 72, as shown in FIG. 3, extends diagonally toward the side of the conveyor and guides the pallets in movement along the conveyor 17.

A work operation can be performed on the workpiece carried by the pallets 1 by an operator who is seated along the return conveyor 19. The pallets 1 containing component parts or workpieces are held at the work station by a finger stop assembly 73, which is similar in construction to finger stop assembly 28. A series of pallets will be stacked against the finger stop assembly 73, and when the stack is of sufficient length to actuate the arm 74 of limit switch 75, a signal will be transmitted to the finger stop assembly 69 to prevent the finger stop assembly 69 from retracting so that no further pallets will be transferred to the conveyor 19. After the work operation has been performed on the component parts held by pallets stacked against the finger stop assembly 73, the operator, through manual operation of a lever, will cause the finger stop assembly 73 to be retracted for a period of time sufficient to permit two pallets pass the finger stop. The finger stop assembly 73 will then return to its extended position and additional pallets will stack against the finger stop assembly 73 in position to have the work operation performed.

In operation, the pallets will move along the conveyor 2 and will stack against the extended finger stop assembly 28. When the stack of pallets is of sufficient length to trip the limit switch 56, a signal will be sent upstream to stop the supply of pallets. With the limit switch 53 closed, indicating that a pallet is against the finger stop assembly 28, and with the limit switch 70 open, the pusher unit 29 will be actuated to move the pallet laterally from the conveyor 2 onto the inclined conveyor 16. This action will be repeated with successive pallets being transferred to the conveyor 16, until the stack or trains of pallets against the stop assembly 69 is of sufficient length to close the limit switch 70. If the limit switch 74 is open, the stop assembly 69 will be retracted for a period of time to permit one of the stacked pallets to be moved past the stop and be transferred to the conveyor 19. The pallets moving on conveyor 19 will be held against the extended stop assembly 73. When the stack of pallets against the stop 73 is of sufficient length to close the limit switch 74, a signal will be sent to the stop assembly 69 to prevent further pallets from being transferred to the conveyor 19.

The operator will perform a working operation on the workpieces carried by the pallets stacked against the stop assembly 73. After the operation has been completed, the operator will manually actuate a lever to retract the stop assembly 73 and permit one or more pallets to move along the continuously moving conveyor 19 and onto the lower conveyor 3. The stop assembly 73 is retracted for a period of time sufficient to permit the desired number of pallets to pass and then returns to its extended position to thereby obstruct succeeding pallets for the next succeeding working operation.

While the drawings show the conveyors 2, 3, 4 and 5 each being a single conveyor, it is contemplated, depending on the length of the system, that one or more conveyor sections may be utilized in end-to-end relation. The invention also includes a device for preventing small parts or foreign material from lodging between the adjacent ends of the belts 15 of conveyor sections. As shown in FIG. 12, a shield 76 is inserted between the ends of adjacent belts and the shield includes an elongated stem portion which projects between the belts and a generally flat head which lies on the belt surfaces. The head prevents materials from falling and jamming within the adjacent belts and yet will not obstruct movement of the pallets from one conveyor section to the next.

The pivoting conveyor section 7 can be utilized, as best illustrated in FIGS. 9 and 10, to transfer pallets 1 from the lower conveyor 3 to the upper conveyor 2. As previously described, after working operations are performed at work station 6, the pallets are transferred to the lower conveyor 3. Often it is desired to perform a second working operation on the workpieces carried by the pallets and in this situation, the pallets are moved upwardly from the lower conveyor 3 to the upper conveyor 2 and again pass through a series of work stations, as previously described.

To mount the pivoting conveyor section 7 for pivoting movement, a pair of angle brackets 77 are mounted on the cross channel 12 and the side walls of the conveyor frame 13 are pivoted to the brackets 77 so that the conveyor will pivot about the axis of the drive roller 14. The belt 15 of conveyor section 7 is driven by a motor 78 having its drive shaft 79 connected to the input shaft of gear box 80. The motor 78 and gear box 80 are mounted on the supporting structure 9. As shown in FIGS. 9 and 10, the gear box 80 is provided with four output shafts disposed in a rectangular pattern with three output shafts 81, 82 and 83 being utilized to drive the conveyors 2, 3 and 7. Output shaft 81 is connected to the drive roller 14 of an upper conveyor section 2, while the shaft 82 is connected to the drive roller 14 of a lower conveyor section 3. The third shaft 83 is operably connected to the drive roller 14 of the pivoting conveyor section 7. Thus, operation of the motor 78 acting through the gear box 80 will drive the belts of the three conveyors at either the same speed or at different speeds depending on the requirements of the conveyor system.

To pivot the conveyor 7, a fluid cylinder 84 is mounted beneath the conveyor 7 and the lower end of the cylinder is pivotally connected to the foundation. A piston rod 85, which is slidable within cylinder 84, is pivotally attached to a plate 86 which is mounted on the lower surface of the frame 13 of conveyor 7. A fluid, such as air, is adapted to be introduced into opposite ends of the cylinder through the lines 87 and 88. By introducing through line 87 to the cylinder 84, the piston rod 85 will be extended to thereby pivot the conveyor 7 upwardly to bring the end of the conveyor into registry with the upper conveyor 2, as shown by the dashed lines in FIG. 10. Conversely, introducing air into the line 88 will withdraw the piston rod to lower the conveyor 7 so that it is in alignment with the conveyor sections of the lower conveyor 3. To control the operation of the conveyor 7, a finger stop assembly 90, similar in construction to finger stop assembly 28, is mounted on the side wall of the conveyor 7 and a limit switch 91, having a pivotable arm 92 that projects over the belt of the conveyor 7, is located immediately upstream of the stop assembly 90. Positioned upstream of the limit switch 91 is a sensing unit which consists of a photoelectric eye 93 mounted on one side of the conveyor 7 and a sensor 94 which is located on the opposite side of the conveyor. The sensing assembly is focused slightly above the level of the pallets and is intended to sense the presence of a workpiece or component part on the pallet 1.

In addition, a second limit switch 95 is mounted upstream of the photosensing unit and carries a pivotable arm 96 which projects over the belt of the conveyor 7.

As in the case of the finger assembly 28, the finger assembly 90 is adapted to stop the travel of a pallet on the conveyor 7 and the limit switch 91 acts in a manner similar to limit switch 55 and is closed by the presence of a pallet engaged with the stop assembly 90. As previously noted, the photosensing unit will sense whether the pallet which is stopped by the stop assembly 90 contains a workpiece.

The limit switch 95 is positioned to sense the presence of an adjustable flag 97 which is mounted on the side edge of each pallet 1. As shown in FIG. 11, the flag 97, which can be a rectangular bar, is slidably mounted within a recess in the shoulder 52 of each pallet. At certain of the stations 6, the workpiece mounted on the pallet may be tested or inspected and if the workpiece is not up to the required standards, the operator will depress the flag, while the flags will remain in an upper position for those pallets which contain properly operating workpieces, alternately, the flag could be actuated by mechanical or fluid means.

In one manner of operation of the pivoting conveyor 7, as shown in FIGS. 9 and 10, if the photoelectric eye unit 93, 94 senses the presence of a workpiece on the pallet and if the limit switch 95 is closed because of the presence of a flag 97 in its upper position, a signal will be transmitted to the cylinder 84 to extend the piston rod 85 and move the conveyor 7 to its upwardly inclined position. The finger stop assembly 90 is then retracted enabling one or more pallets stacked behind the stop 90 to be transferred from the inclined conveyor 7 to the upper conveyor 2.

Spaced guide rails 98 are mounted in the supporting structure 9 and extend upwardly on either side of the conveyor 7. The guide rails serve to guide the conveyor 7 in vertical pivoting movement.

As previously noted, one or more rotary transfer units 8 can be incorporated in the conveyor system to move the pallets 1 from the upper conveyor 2 to the upper conveyor 4, or alternately from lower conveyor 3 to lower conveyor 5. In transferring, the pallets 1 are rotated through 180°, so that the same side of the pallet is leading in travel.

Figure 13:
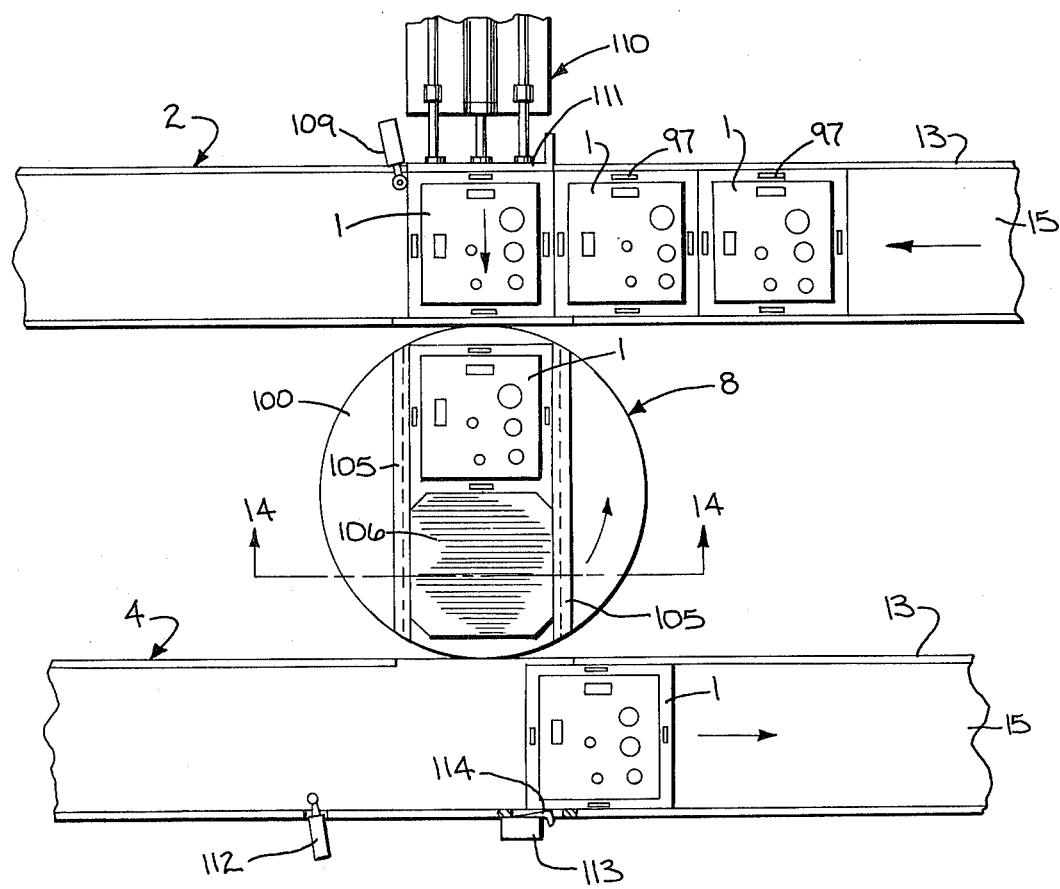
FIG. 13 is a plan view of a portion of the conveyor system and illustrating a rotary transfer unit.
Figure 14:
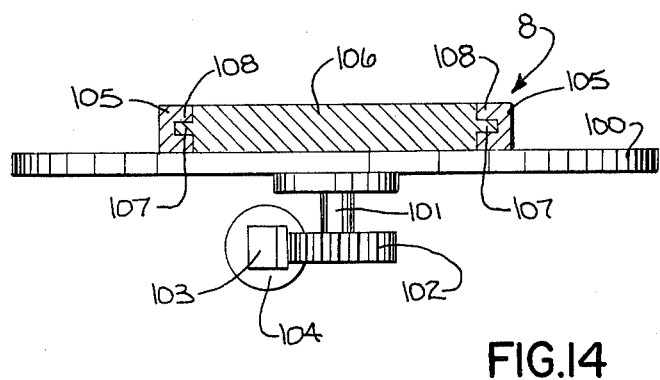
FIG. 14 is a vertical section taken along line 14—14 of FIG. 13.

As best shown in FIGS. 13 and 14, the rotary transfer unit 8 includes a rotary disc or platform 100 which is mounted between the conveyors 2 and 4. The disc 100 is mounted on the upper end of a vertical drive shaft 101, which carries a pinion 102 that is driven by a reciprocating rack 103. As best shown in FIG. 14, the rack 103 is connected to the ram of a fluid cylinder 104, and as the ram is extended and retracted, the rack 103 will rotate the pinion 102 and platform through an arc of 180°.

A pair of parallel guide rails 105 are mounted on the upper surface of the disc 100 and the spacing between the guide rails is slightly greater than the lateral dimension of a pallet 1. Positioned between the guide rails is a movable spacer 106. As shown in FIG. 14, the spacer 106 is provided with outwardly extending guides 107 which project laterally from the side edges of the spacer and are guided for movement within guideways 108 formed in the guide rails 105, A finger stop assembly 109, similar in construction to finger stop assembly 28, is mounted along the side of the conveyor 2 and when in the extended position, will serve to stop and stack a series of pallets, as shown in FIG. 13.

To push the pallets laterally from the conveyor 2 onto rotary disc 100, a pusher unit 110, similar in construction to pusher unit 29, is utilized. The pusher unit includes a pusher plate 111 and when actuated, will move the pallet laterally onto the disc 100, between the guide rails 105, pushing the spacer 106 ahead of it. With the pallet 1 on the disc 100, as shown in FIG. 13, the disc 100 is then rotated 180° by operation of cylinder 104 to position the pallet, which is on the disc, adjacent conveyor 4 and to move the spacer 106 to a position adjacent conveyor 2.

The pusher unit 110 is then again actuated moving a second pallet from the conveyor 2 onto the disc 100, pushing the spacer 106 and the original pallet ahead of it and causing the original pallet to be moved from the disc 100 and onto the conveyor 4. After the pusher unit 110 is retracted, disc 100 is again rotated 180° to move the second pallet to a location adjacent the conveyor 4 and to correspondingly move the spacer 106 to a position adjacent conveyor 2. The process can be repeated to transfer any desired number of pallets from the conveyor 2 onto the conveyor 4.

As shown in FIG. 13, a finger stop assembly 112, similar in construction to finger stop assembly 28, can be mounted on the side of conveyor 4 in position, when extended, to stop the flow of pallets 1 on conveyor 4. In addition, a limit switch 113 is mounted on conveyor 4 in the path of pallets being moved from disc 100 onto conveyor 4, and switch 113 has a pivotable arm 114 that is actuated by the pallet moving onto conveyor 4. The system is programmed so that the disc 100 will not be rotated until the pallet that has been moved onto conveyor 4 from disc 100 has cleared the switch arm 114.

Various modes of carrying out the invention are contemplated as being within the scope of the following claims particularly pointing out and distinctly claiming the subject matter which is regarded as the invention.

I claim:

1. In a conveyor system, a conveyor including a moving endless conveyor member, a plurality of pallets to carry workpieces and movable on said conveyor member, a stop assembly disposed adjacent the conveyor member and including a stop member movable between an extended obstructing position where the stop member is disposed above the conveying member to a nonobstructing retracted position, guide means for guiding the stop member in movement between said positions, said guide means including a fixed first guide member and a second guide member connected to said stop member and slidable with respect to said first guide member, said guide members having mating elongated guide surfaces, a row of ball bearings located between said mating guide surfaces, power operated retracting means operably connected to said stop member for moving the stop member to the retracted position, said retracting means being a fluid operated reciprocating mechanism movable in a first stroke and a second stroke, said strokes being generally transverse to the direction of movement of said conveyor member, said mechanism being operable engaged with said stop member when said mechanism is moved in said first stroke whereby movement of said mechanism in said first stroke will move said stop member to the retracted position and said mechanism being freely slidably relative to said stop member when said mechanism is moved in the second stroke, and biasing means for urging the stop member toward the obstructing position, whereby the leading end of a pallet in the direction of movement of the pallet on the conveying member is adapted to engage said stop member when said stop member is in the obstructing position to hold the pallet against movement on the moving conveyor member, movement of the retracting means through the first stroke effecting release of the pallet, movement of the retracting means through the second stroke causing the stop member to be biased against the longitudinal side of the released pallet until said released pallet has passed the stop member, whereupon the biasing means urges the stop member into the obstructing position to thereby engage the leading end of a subsequent pallet.

2. The conveying system of claim 1, and including a rotatable guide member mounted on the end of said stop member for rotation about an axis normal to the direction of movement of said stop member and disposed to be biased into engagement with the side of a pallet moving on said conveyor member after the stop member has moved to its retracted position to permit the pallet to move past the stop member.

3. The conveying system of claim 1, wherein said pallet includes a base section and an upper section, said base extending rearwardly beyong the upper section whereby said stop member can ride against the side of said upper section and will drop behind said upper section under the influence of said biasing means to move to the obstructed position to stop the next succeeding pallet.

4. The conveying system of claim 1, wherein said mechanism is a fluid operated cylinder.

5. The conveying system of claim 1, wherein each guide surface is an elongated guideway having a generally semi-circular cross section, said ball bearings being located within said guideways.

6. In a conveyor system, a conveyor including a moving endless conveyor member, a plurality of articles movable on said conveyor member, a stop assembly disposed adjacent the conveyor member and including a stop member movable between an extended obstructing position where the stop member is disposed above the conveying member to a non-obstructed retracted position, guide means for guiding the stop member in movement between said extended and retracted positions, said guide means incluuing a fixed first guide member and a second guide member connected to said stop member and slidably with respect to said first guide member, said guide members having a set of mating elongated guideways located on either side of the longitudinal center line of said guide means, a row of ball bearings disposed in each set of mating guideways, retracting means operably connected to the stop member for moving the stop member from the extended to the retracted position, said retracting means being fluid operated reciprocating mechanism movable in a first stroke and a second stroke, said strokes being generally transverse to the direction of movement of said conveyor member, said mechanism being operably engaged with said stop member when said mechanism is moved in said first stroke whereby movement of said mechanism in said first stroke will move said stop member to the retracted position and said mechanism being freely slidable relative to said stop member when said mechanism is moved in the second stroke, and biasing means for urging the stop member toward the obstructing position, whereby the leading end of an article in the direction of movement of the article on the conveying member is adapted to engage said stop member when said stop member is in the obstructing position to hold the article against movement on the moving conveyor member, movement of the retracting means through the first stroke effecting release of the article, movement of the retracting means through the second stroke causing the stop member to be biased against the longitudinal side of the released article until said released article has passed the stop member, whereupon the biasing means urges the stop member into the obstructing position to thereby engage the leading end of a subsequent article.

7. The conveyor system of claim 6, wherein said stop member is mounted for movement along a path of travel disposed at an acute downstream angle of approximately 5°.

* * * * *

UNITED STATES PATENT AND TRADEMARK OFFICE
CERTIFICATE OF CORRECTION

PATENT NO. : 4,487,309

DATED : December 11, 1984

INVENTOR(S) : WOLFGANG C. DORNER

It is certified that error appears in the above-identified patent and that said Letters Patent is hereby corrected as shown below:

Col. 10, Line 57, CLAIM 3, Cancel "beyong" and substitute therefor ---beyond---; Col. 11, Line 12, CLAIM 6, Cancel "slidably" and substitute therefor ---slidable---.

Signed and Sealed this

Twenty-first Day of May 1985

[SEAL]

Attest:

DONALD J. QUIGG

Attesting Officer

Acting Commissioner of Patents and Trademarks